US008068817B1

(12) United States Patent
Viswanath et al.

(10) Patent No.: US 8,068,817 B1
(45) Date of Patent: Nov. 29, 2011

(54) VIRTUAL ADDRESS TRANSLATION TO SUPPORT WIRELESS ACCESS TO DATA NETWORKS

(75) Inventors: Kaartik Viswanath, Santa Clara, CA (US); Jayaraman R. Iyer, Sunnyvale, CA (US); Marco C. Centemeri, Rho (IT); Wen-Lin Tsao, Fremont, CA (US); Laurent Andriantsiferana, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 2964 days.

(21) Appl. No.: 10/229,488

(22) Filed: Aug. 27, 2002

(51) Int. Cl.
*H04M 3/42* (2006.01)

(52) U.S. Cl. .................. 455/414.1; 455/414.3; 455/417; 455/422.1; 455/432.1; 455/432.3; 455/433; 455/434

(58) Field of Classification Search ............... 455/414.1, 455/414.3, 417, 422.1, 432.1, 432.3, 433, 455/434
See application file for complete search history.

(56) References Cited

U.S. PATENT DOCUMENTS

| | | | |
|---|---|---|---|
| 6,496,505 B2 * | 12/2002 | La Porta et al. | 370/392 |
| 6,504,839 B2 | 1/2003 | Valentine et al. | 370/354 |
| 6,813,503 B1 * | 11/2004 | Zillikens et al. | 455/457 |
| 2001/0039585 A1 * | 11/2001 | Primak et al. | 709/228 |
| 2002/0015391 A1 * | 2/2002 | Kriaras et al. | 370/328 |
| 2003/0119532 A1 * | 6/2003 | Hatch | 455/466 |
| 2003/0208628 A1 * | 11/2003 | Karjanlahti | 709/249 |

OTHER PUBLICATIONS

ETSI, "Draft ETSI EN 301 347 v7.3.0 (Jan. 2000); Digital cellular telecommunications system (Phase 2+); General Packet Radio Service (GPRS); GPRS Tunnelling Protocol (GTP) across the Gn and Gp Interface (GSM 09.60 version 7.3.0 Release 1998)," European Telecommunications Standards Institute, pp. 1-69, 2000.

* cited by examiner

*Primary Examiner* — Patrick Edouard
*Assistant Examiner* — Matthew Genack
(74) *Attorney, Agent, or Firm* — Baker Botts L.L.P.

(57) ABSTRACT

In a telephony communication system, mobile devices request access to packet-based networks using network access requests that identify access point names associated with the networks. The mobile devices and an operator network providing access to the networks support the use of virtual access point names within network access requests. These virtual access point names need not correspond to any existing networks. Rather, network access requests incorporating virtual access point names indicate actually requested access point names within other fields of the network access requests.

23 Claims, 4 Drawing Sheets

VIRTUAL ADDRESS TRANSLATION TO SUPPORT WIRELESS ACCESS TO DATA NETWORKS

TECHNICAL FIELD OF THE INVENTION

The present invention relates generally to wireless access to data networks and, more particularly, to virtual address translation to support wireless access to data networks.

BACKGROUND OF THE INVENTION

As wireless devices become increasingly sophisticated, protocols and network equipment have evolved to support enhanced services, such as packet-based communications with data networks. However, portions of the telephony infrastructure remain reliant upon outdated protocols and equipment that are ill-prepared to handle the dynamic and rapid pace of today's networks. For example, the home location register (HLR) governs, in part, the ability of wireless devices to access packet-based networks. However, because of the ever-changing array of available data networks, it can be extremely difficult to maintain home location registers properly configured.

SUMMARY OF THE INVENTION

In accordance with the present invention, techniques for virtual address translation to support wireless access to data networks are provided. According to particular embodiments, the system provides a virtual addressing scheme to minimize impacts on home location register (HLR) configuration.

According to a particular embodiment, a method for processing network access requests for mobile devices receives a network access request for establishment of a communication link for data communications for a mobile device, with the network access request including a requested network field and a pass-through field. The method determines a requested network from text in the pass-through field, sets the requested network field to the requested network, and determines a gateway linking to the requested network. The method then forwards the network access request to the gateway.

Embodiments of the invention provide various technical advantages. By configuring an HLR to accept one or more virtual network addresses, the system limits configuration changes to the HLR. By embedding actual network addresses within pass-through fields of network access requests, the system allows dynamic equipment, such as a virtual address translation module or a gateway generalized packet radio service (GPRS) serving node (GGSN), to handle processing of network access requests. This enables administrators of network equipment to focus configuration efforts upon more sophisticated and protocol aware elements, which allows networks to more appropriately reflect the dynamic nature of today's communication systems.

Moreover, the system may include a module that handles translation of virtual addresses to actually requested addresses. If desired, this module can be included in systems that otherwise would not support virtual address requests. Thus, this module can supplement the capabilities of a network to support network access requests generated using virtual addressing.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
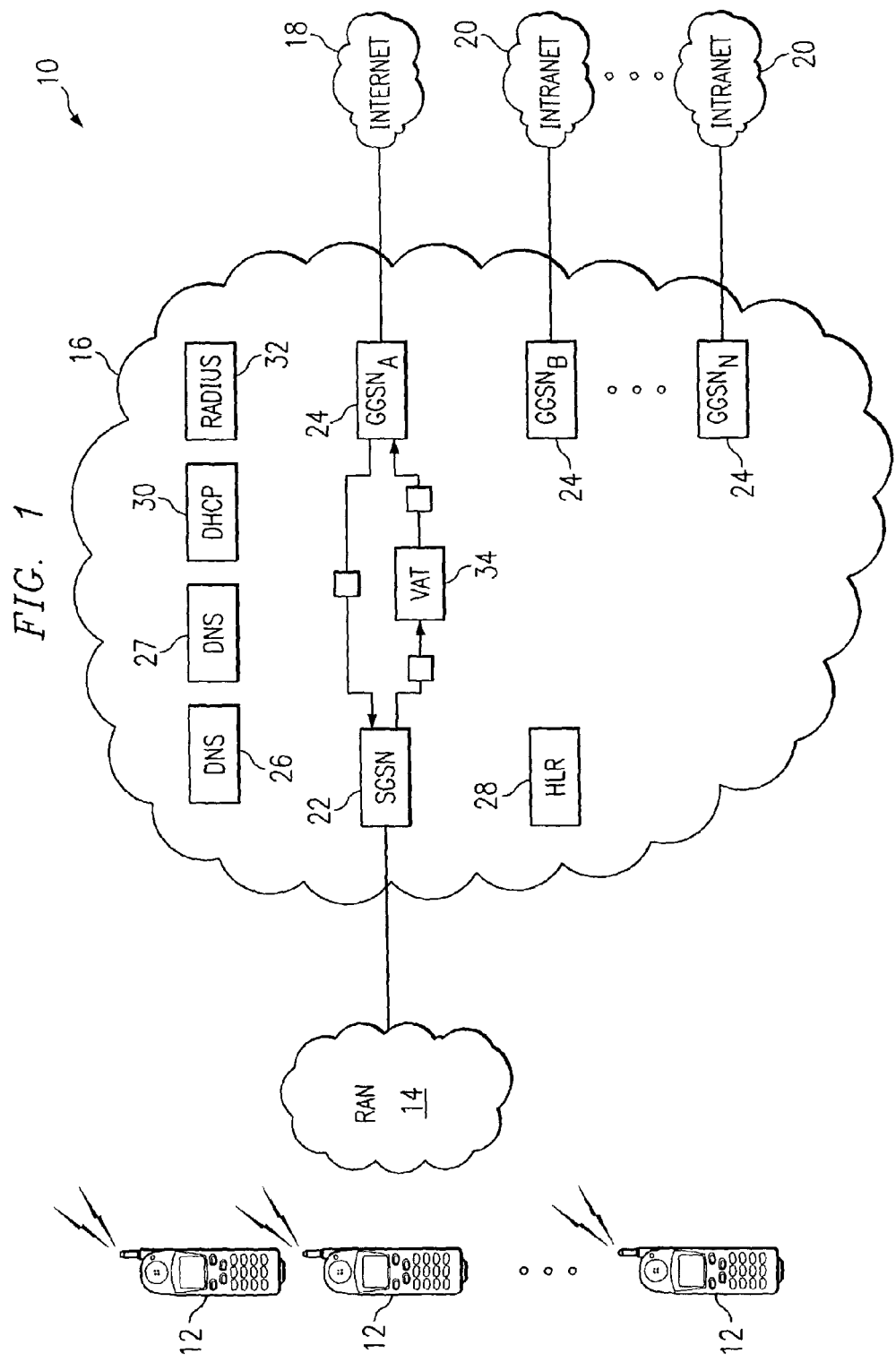
FIG. 1 illustrates a communication system that includes mobile devices and a virtual address translation module that support virtual addressing in accordance with particular embodiments of the present invention.

FIG. 1 illustrates a communication system, indicated generally at 10, that includes mobile devices 12, a radio access network 14, an operator network 16, and data networks, such as internet 18 and intranets 20. In general, elements of system 10 support wireless communications and access of mobile devices 12 to data services provided by the data networks. To access data networks, mobile devices 12 generate network access requests that identify requested networks using, for example, access point names (APNs) assigned to the networks. According to particular embodiments, elements of system 10 are configured to support access to networks based on network access requests that identify virtual networks. These requests use pass-through fields within the network access requests to indicate actual networks to which access is requested.

Mobile devices 12 support wireless communications and provide packet-based access to data networks. Mobile devices 12 may be, for example, mobile phones, personal digital assistance, wireless enabled computers, or any other suitable device for providing wireless access to data networks. According to particular embodiments, mobile devices 12 support generalized packet radio service (GPRS) access to voice and data services. Mobile devices 12 access data networks using wireless communications supported by radio access network 14. To access data networks, mobile devices 12 generate network access requests that identify access point names of the requested data networks. Typical network access requests further include other information, such as a user identifier, password, and mobile device identifier.

Radio access network (RAN) 14 supports wireless access of mobile devices 12 to voice and/or data services. Thus, RAN 14 represents any suitable collection and arrangement of components, such as radio transceivers and support infrastructure, that link mobile devices 12 to operator network 16. Operator network 16 links RAN 14 to one or more data networks, such as internet 18 and intranets 20. Data networks, such as internet 18 and intranets 20, represent any suitable networks providing network services to accessing devices, such as mobile devices 12. These network services include the communication of information such as voice, video, and data using packet-based protocols.

In the embodiment illustrated, operator network 16 includes a serving node 22 linking to RAN 14 and gateways 24 linking to various data networks. In addition, operator network 16 includes domain name servers (DNS) 26 and 27, a home location register (HLR) 28, a dynamic host configuration protocol (DHCP) server 30, and a radius server 32. HLR 28 provides traditional home location register features for operator network 16. DHCP server 30 enables dynamic assignment of IP addresses to requesting devices. Radius server 32 provides for authorization and authentication of users. Domain name servers 26 and 27 map domain names to internet protocol (IP) addresses and return these addresses in response to appropriate requests. For example, in response to a request identifying a particular access point name, domain name server 26 returns a list of IP addresses for gateways 24 providing access to the identified access point name. While illustrated as including two domain name servers, system 10 may include any number of domain name servers each serving different groups of elements.

Serving node 22 links to RAN 14 and handles initial processing of network access requests received from mobile devices 12. For example, according to particular embodiments, operator network 16 supports GPRS protocols, and serving node 22 acts as a serving GPRS support node (SGSN). Upon receiving a network access request from one of mobile devices 12, serving node 22 accesses HLR 28 to verify the request. For example, serving node 22 may identify an access point name from the request and access HLR 28 to determine whether the indicated access point name identifies a valid network. Thus, the configuration of HLR 28 can control whether or not mobile devices 12 may access particular networks.

To provide generic access through HLR 28 to data networks, HLR 28 is configured to recognize one or more virtual networks. For example, HLR 28 may be configured to recognize virtual access point names such as "internet" or "intranet." These virtual networks need not correspond to any actual networks reachable through operator network 16, but rather provide static configurations within HLR 28 that can minimize the need for configuration changes to HLR 28 and shift the burden of access request processing to other elements within operator network 16.

Upon receiving appropriate verification from HLR 28, serving node 22 accesses domain name server 26 to determine an IP address associated with the access point name identified in the network access request. In response to this request, domain name server 26 returns one or more IP address matching to the access point name in the domain name request. Within operator network 16, gateways 24 provide access to various data networks identified by access point names. Thus, domain name server 26 is configured to return IP addresses of gateways 24 in response to domain name requests that identify networks accessible through gateways 24.

However, some or all gateways 24 may be unable to process network access requests that identify virtual access point names. To handle translation of these virtual network access requests, system 10 include a virtual address translation module 34. So that serving node 22 forwards the request appropriately, domain name server 26 is configured to match virtual access point names to the IP address for virtual address translation module 34. Therefore, when serving node 22 requests the IP address for reaching a virtual access point name, domain name server 26 returns the address of virtual address translation module 34. For example, in response to a domain name request requesting an IP address associated with the access point name "internet," domain name server 26 return the IP address for virtual address translation module 34. Thus, domain name server 26 is configured to recognize virtual networks and return the IP address for virtual address translation module 34 in response to domain name requests identifying virtual networks. However, because some gateways 24 may support processing of virtual network access requests, domain name server 26 may map some portion of virtual addresses to specific gateways 24. Therefore, domain name server 26 may map only some virtual addresses to virtual address translation module 34.

According to other embodiments, virtual address translation module 34 handles both virtual and traditional network access requests. That is, virtual address translation module 34 can forward network access requests to appropriate gateways 24 regardless of whether the requests indicate virtual or actual access point names. Thus, domain name server 26 may map some or all actual access point names to the IP address for virtual address translation module 34.

Upon receiving an IP address from domain name server 26, serving node 22 forwards the network access request to the identified IP address. As a part of this process, serving node 22 may reformat and/or supplement the request with additional information. For example, according to particular embodiments, serving node 22 uses the information from an access request received from mobile device 12 to generate a create packet data protocol (PDP) context request. Regardless of the exact format, the access request generated by serving node 22 includes the access point name and other information, such as a user identifier, password, and other information received from mobile device 12. After performing appropriate formatting or processing of the information from mobile device 12, serving node 22 forwards the network access request to the IP address identified by domain name server 26. For some or all access point names, this results in serving node 22 forwarding the network access request to virtual address translation module 34.

Upon receiving a network access request, virtual address translation module 34 identifies an actually requested access point name, modifies the request if appropriate, and forwards the modified request to the appropriate gateway 24. To perform its functions, virtual address translation module 34 includes any suitable combination and arrangement of hardware and/or controlling logic. Moreover, system 10 contemplates virtual address translation module 34 residing within any appropriate element. For example, virtual address translation module 34 may be a separate module installed within system 10 to provide translation of virtual network access requests. Alternatively, one of gateways 24 may include some or all of the functionality of virtual address translation module 34. By providing virtual address translation module 34, system 10 provides support for virtual network access requests without requiring that all other elements, such as all gateways 24, have an awareness of this type of request. That is, virtual address translation module 34 modifies network access requests identifying virtual addresses to identify the actually requested networks and then forwards the requests to appropriate gateways 24.

Gateways 24 link operator network 16 to data networks and, along with serving nodes 22, provide mobile devices 12 access to these data networks. In the embodiment illustrated, gateways 24 link with data networks, such as internet 18 and intranet 20. However, while each gateway 24 is shown linking to a single network, each gateway 24 may link with multiple networks, and multiple gateways 24 may link to the same network. As previously discussed, these networks or portions of these networks are identified by access point names, which, for example, can be names defined or assigned by standards organizations to uniquely identify IP networks.

During operation, gateways 24 provide access to data networks in response to network access requests forwarded by serving node 22. For example, after appropriately processing a network access request from serving node 22, gateway 24 and serving node 22 may form a communication link to transport packets across operator network 16. This communication link then serves as a transport mechanism for packets between mobile device 12 and the data network. According to particular embodiments, gateway 24 and serving node 22 form this communication link using GPRS tunneling protocol (GTP) to form a tunnel. Gateway 24 uses this GTP tunnel to insure that packets are communicated to and from serving node 22 currently acting as the attachment point for mobile device 12. Thus, if mobile device 12 moves to an area served by a different serving node 22, gateway 24 can reattach the tunnel to the new serving node 22.

Before forming a communication link for mobile device 12, gateway 24 processes the network access request received from serving node 22. This processing includes steps such as authentication, authorization and address assignment. To aid with this processing, gateway 24 may access DHCP server 30 and radius server 32. For example, gateway 24 may use DHCP server 30 to dynamically allocate an IP address to identify mobile device 12 during a communication session.

Radius server 32 provides authentication and authorization services. In response to an authentication and authorization request that identifies a user, password and requested network, radius 32 indicates whether the user is authorized and authenticated. For example, using the user identifier and password, radius server 32 can authenticate the identity of the user. Using the user identifier and requested network, radius server 32 can determine whether the user is authorized to access that network.

Upon receiving a network access request, gateway 24 uses DHCP server 30 and/or radius server 32 to process the request and determine whether mobile device 12 should be granted access to the requested network. In providing mobile devices 12 access to data networks, gateways 24 maintain routing information for these mobile devices 12. As previously discussed, this routing information enables gateway 24 to tunnel packets to appropriate serving nodes 22 for each attached mobile device 12. Thus, during operation, gateway 24 acts as the termination point for the mobile portion of the communications between mobile devices 12 and data networks. That is, devices within data networks communicating with mobile devices 12 need not have any awareness of the mobile nature of mobile devices 12.

To gain access to data networks, mobile device 12 generates and communicates a network access request to operator network 16. This request includes fields identifying information including the requested network and a user identifier. Mobile device 12 generates the request using stored information and/or information provided by a user. For example, through a graphical user interface, a user may provide a user identifier, such as Bob, and specify a network to access, such as Cisco.com. In response to such a request, mobile device 12 may generate a network access request that identifies an access point name of Cisco.com and a user identifier of Bob. However, as previously discussed, for such a request to be appropriately processed by operator network 16, HLR 28 should be configured to recognize the indicated access point name (in this example, Cisco.com). And since the range of potential access point names is vast and dynamic, the configuration and upkeep of antiquated HLR systems can prove difficult.

Therefore, mobile device 12 supports network access requests using virtual access point names. To generate a "virtual" network access request, mobile device 12 uses a virtual access point name as the indicated access point name and includes the actually requested access point name within another field of the network access request. For example, using the previous values, in the access point name field, mobile device 12 uses a value of intranet, and as the user identifier, mobile device 12 uses a value of Bob@Cisco.com. Thus, the network access request requests access to the virtual access point name of intranet while incorporating the actually requested access point name within another field of the request. Therefore, within this description, the term virtual network access request refers to any suitable message requesting access to a virtual access point name.

In the example given, mobile device 12 incorporates the actually requested access point name within the user identifier. This field is selected because, with respect to HLR 28 and serving node 22, this is a pass-through field. That is, the user identifier field does not affect the operation of HLR 28 or serving node 22. Moreover, serving node 22 passes the value of the user identifier field through in the network access request forwarded on to gateway 24 or virtual address translation module 34. Therefore, the user identifier value set by mobile device 12 passes to gateway 24 or virtual address translation module 34 without affecting the operation of serving node 22 or HLR 28, and can thus include any suitable information generated by mobile device 12 for interpretation by virtual address translation module 34. However, while in the example given, mobile device 12 includes the actually requested access point name in the user identifier value, system 10 contemplates mobile device 12 incorporating this actually requested access point name within any suitable pass-through field of the network access request. That is, network access requests from mobile devices 12 may include a number of different pass-through fields, and system 10 contemplates mobile devices 12 and virtual address translation module 34 using any one of these pass-through fields in which to indicate actually requested access point names.

After generating the network access request, mobile device 12 communicates the request to operator network 16. Within operator network 16, serving node 22 receives and processes the network access request. As previously discussed, serving node processes the request through communications with HLR 28 that identify the access point name from the request. That is, serving node 22 access HLR 28 with the indicated access point name, regardless of whether the access point name is virtual or not. Thus, for a network access request indicating a virtual access point name, serving node 22 verifies the virtual access point name using HLR 28. If HLR 28 is appropriately configured to validate the virtual access point name, HLR 28 will respond to serving node 22 that the request is valid. Therefore, HLR 28 need not reflect the actual access point name identified in the request, thus reducing the need for frequent maintenance and reconfiguration of HLR 28.

After receiving validation from HLR 28, serving node 22 determines the appropriate destination to receive a forwarded version of the network access request. To identify this destination, serving node 22 accesses domain name server 26 using the network identified within the access point name field of the network access request. Once again, serving node 22 uses the indicated access point name, regardless of whether it is virtual or not. Thus, for the request that identifies a virtual access point name, serving node 22 accesses domain name server 26 using this virtual access point name. In response to a domain name look-up request identifying a virtual access point name, domain name server 26 returns the IP address of virtual address translation module 34. Therefore, to support virtual access point names, both HLR 28 and domain name server 26 should be configured to recognize and respond appropriately to virtual access point names. However, serving node 22 need not have any awareness of the existence or distinction provided by virtual access point names.

After determining an IP address to which to forward the network access request, serving node 22 forwards the request to the identified destination. As previously discussed, serving node 22 may reformat the network access request received from mobile device 12 to conform to protocols expected by gateway 24. According to particular embodiments, whether or not reformatting takes place, the information reflected in pass-through fields remains unchanged. Thus, given the example values above, the user identifier value in the network access request forwarded will include a value of Bob@Cisco.com. Thus, serving node 22 may unwittingly pass through the access point name requested by mobile device 12 for processing by virtual address translation module 34.

Upon receiving a network access request, virtual address translation module 34 determines whether the request indicates a virtual access point name. If not, virtual address translation module 34 simply forwards the request to the appropriate gateway 24. However, if the request indicates a virtual access point name, virtual address translation module 34 identifies an actually requested access point name, modifies the request, and forwards the modified request to the appropriate gateway 24. To determine the actually requested access point name, virtual address translation module 34 analyzes information in fields not typically used to identify the requested network.

For example, given the example network access request above, virtual address translation module 34 parses the user identifier field to determine the portion indicating the user identifier and the portion indicating the actual access point name requested. In this example, virtual address translation module 34 uses the @ sign as a delimiter to parse the user identifier value of Bob and the access point name of Cisco.com. Virtual address translation module 34 then modifies the network access request to remove the virtual network. For example, virtual address translation module 34 may set the user identifier field to Bob and the access point name field to Cisco.com. Therefore, the information in the modified request appears as if mobile device 12 had created the request without using a virtual address.

After modifying the request, virtual address translation module 34 forwards the modified request to an appropriate one of gateways 24. To determine which gateway 24 to receive the request, virtual address translation module 34 communicates a domain name request to domain name server 27 and identifies the requested network within the domain name request. For virtual network access requests, the requested network is the value parsed from the pass-through field. For other requests, the requested network is simply the value from the access point name field. In response to the domain name request, domain name server 27 returns IP addresses for one or more gateways 24 that link to the identified network. Virtual address translation module 34 selects one of these addresses and forwards the network access request to the selected address.

To forward the request, virtual address translation module 34 modifies the header of the network access request so that the destination address identifies the selected IP address for gateway 24. According to particular embodiments, virtual address translation module 34 leaves the source address in the header untouched, so that the network access request appears to have been sent by serving node 22. In this manner, virtual address translation module 34 forwards gateway 24 a network access request that does not include virtual addressing and appears as if generated by serving node 22. This permits gateway 24 to process the request and respond directly to serving node 22 without further communications with virtual address translation module 34.

Upon receiving a network access request, gateway 24 processes the request as discussed above. For example, gateway 24 may authenticate and/or authorize the request, determine an IP address to dynamically assign to mobile device 12, and perform other processing as appropriate. If the request is validated, gateway 24 forms a communication link with serving node 22, for example, by forming a GTP tunnel with serving node 22. Serving node 22 and gateway 24 then use this communication link to transport packets across operator network 16 for communications between mobile device 12 and the requested network. Therefore, whether receiving a network access request from serving node 22 or virtual address translation module 34, gateway 24 may perform similar processing of the request.

Figure 2:
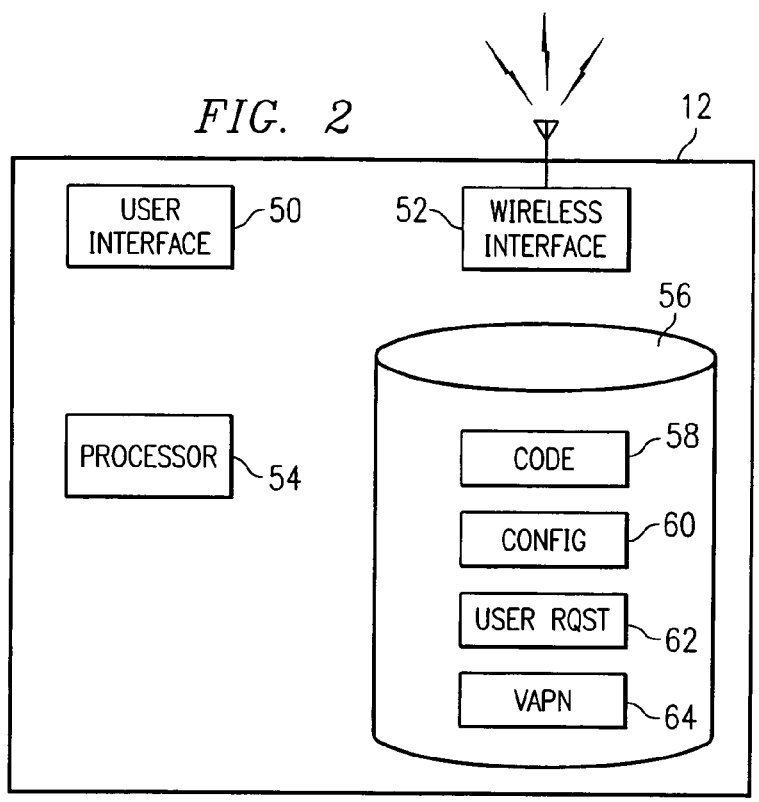
FIG. 2 is a block diagram illustrating exemplary functional components for a mobile device from the system.

FIG. 2 illustrates a particular embodiment of mobile device 12 that includes a user interface 50, a wireless interface 52, a processor 54 and a memory 56. In general, mobile device 12 provides wireless services, including packet-based services, using wireless interface 52. Mobile device 12 provides access to remote data networks by generating network access requests and supports the use of virtual access point names within generated network access requests.

User interface 50 provides for interactions with users of mobile device 12. For example, user interface 50 may include a display, keypad and/or other suitable elements for presenting information to and receiving information from users. Wireless interface 52 supports wireless communications between mobile device 12 and other communications equipment, such as base transceiver stations. Processor 54 controls the management and operation of mobile device 12. For example, processor 54 may include one or more microprocessors, programmed logic devices, or other suitable elements for controlling the operation of mobile device 12.

Mobile device 12 also includes memory 56, which in the embodiment illustrated includes code 58, configuration information 60, a user request 62, and a virtual access point name 64. Code 58 includes software and/or other appropriate controlling logic for use by elements of mobile device 12, such as processor 54. Configuration information 60 includes start-up, operating, and other suitable settings and configurations for use by mobile device 12. For example, configuration information 60 may indicate whether or not to enable virtual access point names when communicating with certain operator networks 16. User request 62 includes information, pre-specified and/or provided by a user, for generating a network access request. For example, user request 62 may include a user identifier, password, and a requested access point name, in addition to other suitable information. Virtual access point name 64 includes a value for use by mobile device 12 in generating virtual network access requests. Virtual access point name 64 includes a value recognizable by gateways 24 as indicating a virtual network. Moreover, virtual access point name 64 corresponds to a value configured in HLR 28 and domain name server 26.

During operation, mobile device 12 generates network access requests and communicates these requests through operator network 16 using wireless interface 52. Mobile device 12 may generate these network access requests in response to commands received from a user through user interface 50. For example, through a web browser, dialog box, or other suitable interface, a user may provide a user identifier, password, and requested access point name. However, some or all of this information may be pre-configured within memory 56 by the user, manufacturer, and/or administrator. In response to the request, processor 54 builds a network access request using information provided by the user and information from memory 56. In building the network access request, mobile device 12 may determine whether the use of a virtual access point name is appropriate. For example, mobile device 12 may access configuration information 60 to determine whether virtual access point names are supported by operator network 16 providing service to mobile device 12.

If the use of a virtual access point name is appropriate, mobile device 12 builds the network access request using virtual access point name 64. As previously discussed, mobile device 12 builds the virtual network access request by inserting virtual access point name 64 within the requested access point name field of the network access request. To include the actually requested access point name, processor 54 builds a pass-through string for insertion into a pass-through field of the network access request. For example, processor 54 may build an @ sign delimited string that indicates both the user identifier and the actually requested access point name and insert this string into the user identifier field of the network access request. As previously discussed, this enables gateway 24 to parse and interpret the different portions of the user identifier field. However, the use of the user identifier field is given only as an example, and system 10 contemplates mobile device 12 using any suitable pass-through field within a network access request in which to incorporate an actually requested access point name. Similarly, the pass-through field may be delimited by any suitable character.

While the embodiment illustrated and the preceding description focus on a particular embodiment of mobile device 12 that includes specific elements, system 10 contemplates mobile device 12 having any suitable combination and arrangement of elements for providing wireless packet-based services and accessing remote networks using virtual network access request. Thus, the modules and functionalities described may be combined, separated or otherwise distributed among any suitable functional components. For example, mobile device 12 may include a wireless telephone coupled to a mobile computer such that the mobile computer accesses packet-based services wirelessly using the mobile telephone. System 10 further contemplates mobile device 12 implementing some or all of the functionalities described using logic encoded in media, such as software or programmed logic devices.

Figure 3:
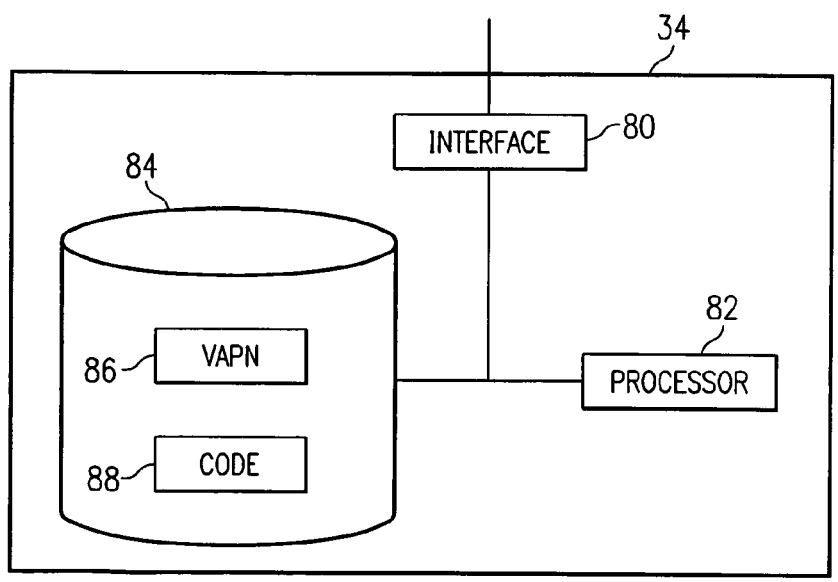
FIG. 3 is a block diagram illustrating exemplary functional components for the virtual address translation module of the system.

FIG. 3 is a block diagram illustrating exemplary functional components for virtual address translation module 34 that include an interface 80, a processor 82, and a memory 84. In general, virtual address translation module 34 provides interpretation and modification of network access requests that identify virtual networks. During operation, virtual address translation module 34 receives network access requests identifying virtual networks, modifies these requests to identify actually requested networks, and forwards the requests to appropriate gateways 24.

Interface 80 links virtual address translation module 34 to other equipment within operator network 16. For example, using operator network interface 80, virtual address translation module 34 may communicate with serving node 22, domain name server 26, gateways 24, and other appropriate elements within operator network 16. Processor 82 controls the operation and management of elements within virtual address translation module 34. For example, processor 82 may include one or more microprocessors, programmed logic devices, or other appropriate controlling elements.

Memory 84 represents any suitable combination and arrangement of local and/or remote storage devices for use by virtual address translation module 34 to maintain and access information during operation. In the embodiment illustrated, memory 84 maintains virtual access point name (VAPN) information 86 and code 88. Code 88 represents software and/or other appropriate controlling logic for use by elements of virtual address translation module 34, such as processor 82, during operation. For example, code 88 may include routines for processing network access requests. VAPN information 86 includes information identifying virtual access point names that may be used to indicate virtual network access requests. Virtual address translation module 34 may use VAPN information 86 to determine those network access requests that appropriately indicate a virtual access point name.

However, while illustrated as maintaining particular data, system 10 contemplates virtual address translation module 34 maintaining any suitable information. For example, virtual address translation module 34 need not store VAPN information 86. Instead of using this explicit information, virtual address translation module 34 may rely on the value of the pass-through field for received requests. For example, to determine whether a request identifies a virtual access point name, virtual address translation module 34 may determine whether the pass-through field includes the delimiter used to separate the pass-through value from the actually requested access point name. If so, virtual address translation module 34 can assume that the access point name field indicates a virtual access point name.

During operation, virtual address translation module 34 interprets and modifies network access requests that identify virtual networks. Upon receiving a network access request, virtual address translation module 34 determines whether the request includes a virtual access point name. According to particular embodiments, virtual address translation module 34 looks for a delimiter in the pass-through field, as described above. According to other embodiments, virtual address translation module 34 accesses VAPN information 86 to determine whether the request indicates a virtual network.

If the network access request identifies a virtual access point name, virtual address translation module 34 identifies an actually requested access point name within the request, modifies the request, and forwards the modified request to the one of gateways 24. As previously discussed, virtual address translation module 34 determines the actually requested network by analyzing information in fields not typically identifying the requested network. For example, if the actually requested network is embedded in the user identifier, virtual address translation module 34 parses the user identifier field to determine the portion indicating the user identifier and the portion indicating the actual access point name requested. Virtual address translation module 34 then modifies the network access request to indicate the actually requested network in the appropriate field.

Virtual address translation module 34 then forwards the request to an appropriate one of gateways 24. As previously discussed, virtual address translation module 34 accesses domain name server 27 using the actually requested network to determine IP addresses for one or more gateways 24 linking to the requested network. Virtual address translation module 34 selects one of these addresses, modifies the header of the request to indicate the selected IP address, and forwards the network access request to the selected address. Therefore, virtual address translation module 34 interprets and modifies virtual network access requests to enable system 10 to support these virtual requests without requiring elements to have an awareness of this support. For example, in the embodiment described, gateways 24 and serving node 22 need not have an awareness of the support for virtual access point names.

However, while the embodiment illustrated and the preceding description focus on a particular embodiment of virtual address translation module 34 that includes specific elements, system 10 contemplates virtual address translation module 34 having any suitable combination and arrangement of elements for processing network access requests that identify virtual access point names. Therefore, the modules and functionalities described may be combined, separated, or otherwise distributed among any suitable functional components, and some or all of the functionalities of virtual address translation module 34 may be formed by logic encoded in media, such as software and programmed logic devices.

Figure 4:
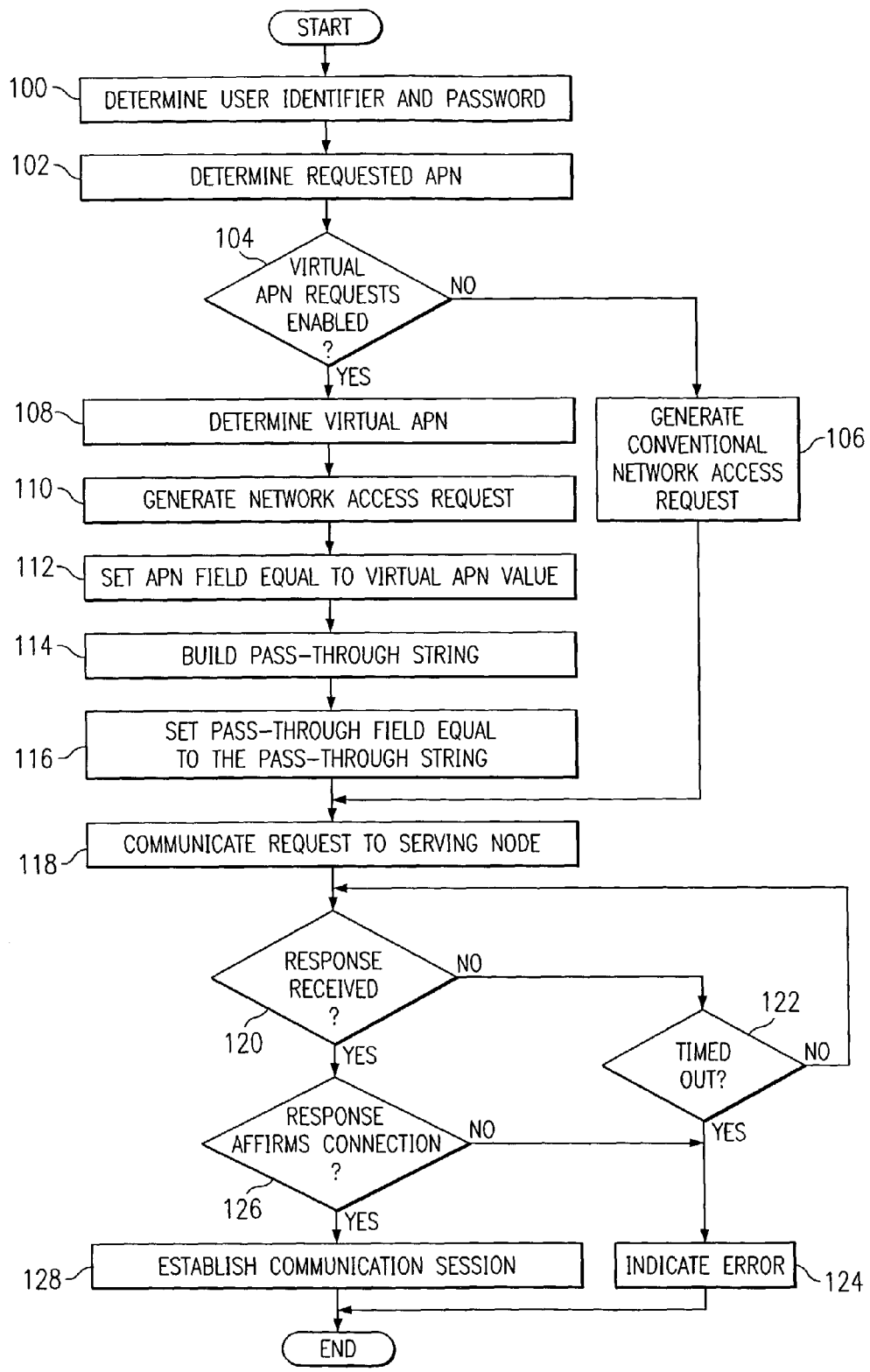
FIG. 4 is a flowchart illustrating a method for the mobile device to generate a network access request using virtual addressing.

FIG. 4 is a flowchart illustrating a method for generating a network access request that potentially includes a virtual access point name. The following text describes the operation of the method with respect to mobile device 12. Mobile device 12 determines a user identifier and password at step 100. For example, mobile device 12 may present a log-in dialog using user interface 50 and receive input from a user. Alternatively, mobile device 12 may access memory 56 to determine pre-configured user identifier and password information. Mobile device 12 determines the requested access point name at step 102. Similar to the determination of the user identifier and password, mobile device 12 may use information maintained within memory 56 and/or interaction with a user through user interface 50. Mobile device 12 determines whether virtual access point name requests are enabled at step 104. If not, mobile device 12 generates a conventional network access request at step 106.

However, if virtual access point name requests are enabled, mobile device 12 determines a virtual access point name at step 108. For example, mobile device 12 may access virtual access point name 64 maintained within memory 56. At steps 110 through 116, mobile device 12 builds a virtual network access request. Mobile device 12 first generates the network access request at step 110 and then sets the access point name field equal to the virtual access point name value at step 112. Mobile device 12 builds a pass-through string at step 114. This pass-through string includes the actually requested access point name and potentially includes other information typically communicated in a pass-through field. For example, as previously discussed, mobile device 12 may build a string that includes both the user identifier and the actually requested access point name for communication in the user identifier field. Mobile device 12 sets the pass-through field equal to the pass-through string at step 116.

After generating a conventional network access request or a virtual network access request, mobile device 12 communicates the request to serving node 22 of operator network 16 at step 118. Mobile device 12 then awaits a response from operator network 16 at steps 120 and 122. At step 120, mobile device 12 determines whether a response has been received, and at step 122, mobile device 12 determines whether the request has timed out. If the request has timed out, mobile device 12 may indicate an error at step 124 and complete processing of the network access request. If a response is received and the response affirms the connection at step 126, mobile device 12 establishes a packet-based communication session at step 128. This enables the exchange of any suitable packet-based data between mobile device 12 and the remote network identified by the actually requested access point name.

Thus, the flowchart and preceding description outline the operation of mobile device 12 in generating a conventional or virtual network access request. However, the flowchart and accompanying description illustrate only an exemplary method of operation, and system 10 contemplates mobile devices 12 using any suitable techniques and elements for generating network access requests that incorporate virtual access point names. Therefore, many of the steps in this flowchart may take place simultaneously and/or in different orders than as shown. In addition, mobile device 12 may use methods with additional steps, fewer steps, and/or different steps, so long as the methods remain appropriate.

Figure 5:
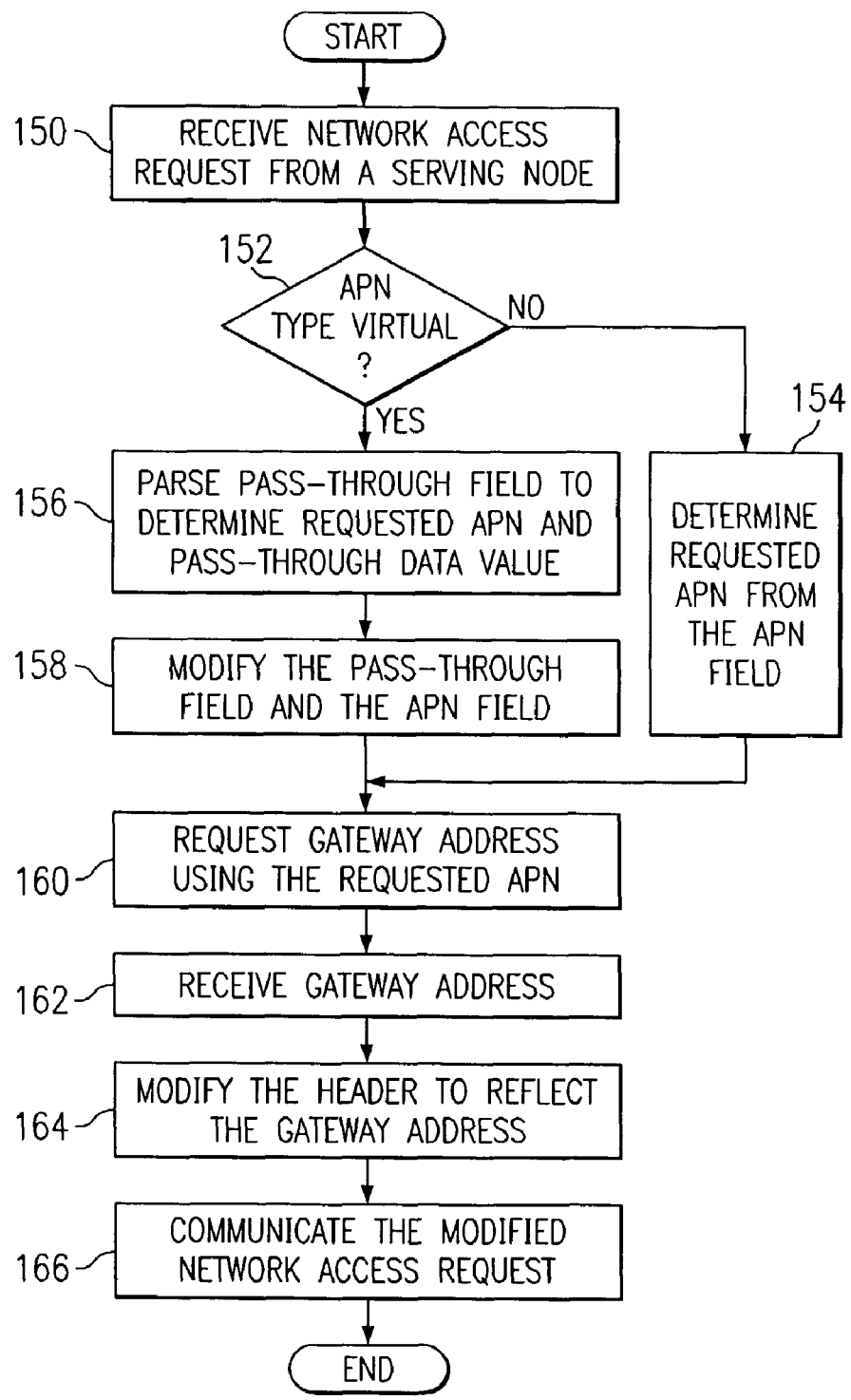
FIG. 5 is a flowchart illustrating a method for the virtual address translation module to process a virtual network access request.

FIG. 5 is a flowchart illustrating a method for virtual address translation module 34 to handle received network access requests. Virtual address translation module 34 receives a network access request from serving node 22 at step 150. Virtual address translation module 34 then determines whether the request includes a virtual access point name at step 152. For example, as previously discussed, virtual address translation module 34 may detect whether or not the pass-through field includes a delimiter used for separating a pass-through value from an actually requested access point name.

If the request is not for a virtual access point name, virtual address translation module 34 determines the requested access point name from the access point name field at step 154. However, if the request identifies a virtual network, virtual address translation module 34 parses the pass-through field from the network access request to determine the actually requested access point name at step 156. After determining the actual access point name requested, virtual address translation module 34 modifies fields in the request using the determined information at step 158. For example, after parsing a user identifier and access point name from a user identifier field, virtual address translation module 34 replaces the user identifier field with the determined user identifier and replaces the access point name field with the determined access point name.

At steps 160 and 162, virtual address translation module 34 determines an IP address for gateway 24 providing access to the requested access point name. For example, virtual address translation module 34 may communicate a domain name request at step 160 and receive a response from domain name server 27 at step 162. Using the received address, virtual address translation module 34 modifies the header of the network access request at step 164. That is, virtual address translation module 34 replaces the destination IP address in the header with the determined IP address for gateway 24. Virtual address translation module 34 forwards the modified network access request to gateway 24 at step 166.

Thus, the flowchart and preceding description outline the operation of virtual address translation module 34 in handling virtual network access requests. However, the flowchart and accompanying description illustrate only an exemplary method of operation, and system 10 contemplates virtual address translation module 34 using any suitable techniques and elements for processing network access requests. Therefore, many of the steps in this flowchart may take place simultaneously and/or in different orders that as shown. In addition, virtual address translation module 34 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for processing network access requests for mobile devices, the method comprising:
receiving a network access request for establishment of a communication link for data communications for a mobile device, the network access request comprising a requested network field and a pass-through field;
determining a requested network from text in the pass-through field;
setting the requested network field to the requested network;
determining a gateway linking to the requested network; and
forwarding the network access request to the gateway.

2. The method of claim 1, wherein determining the requested network comprises parsing the text at a delimiter to determine a value for the pass-through field and the requested network.

3. The method of claim 2, wherein the pass-through field comprises a user identifier field, the method further comprising setting the pass-through field equal to the value for the pass-through field.

4. The method of claim 1, further comprising:
communicating a domain name request to a domain name server, the domain name request identifying the requested network;
receiving an interne protocol (IP) address for the gateway from the domain name server; and
modifying a header of the network access request such that a destination address of the header indicates the IP address for the gateway.

5. The method of claim 1, further comprising:
receiving a second network access request for establishment of a second communication link for data communications for a second mobile device, the second network access request comprising a requested network field and a pass-through field;
determining that the pass-through field of the second network access request does not include a delimiter used to indicate virtual network access requests;
determining a network value in the requested network field of the second network access request;
determining an interne protocol (IP) address based on the network value;
modifying a header of the second network access request such that a destination address of the header indicates the IP address; and
forwarding the second network access request to the IP address.

6. The method of claim 1, wherein the pass-through field does not affect operation of a home location register in verifying a network value indicated in the requested network field of the received network access request.

7. The method of claim 1, wherein:
the request is a create packet data protocol (PDP) context request generated by a serving generalized packet radio service (GPRS) support node (SGSN);
the requested network is an access point name set by the mobile device; and
the requested network field is an access point name information element of the network access request.

8. A virtual address translation module comprising:
an interface operable to receive a network access request for establishment of a communication link for data communications for a mobile device, the network access request comprising a requested network field and a pass-through field; and
a processor operable to determine a requested network from text in the pass-through field, to set the requested network field to the requested network, and to determine a gateway linking to the requested network;
the interface further operable to forward the network access request to the gateway.

9. The virtual address translation module of claim 8, wherein the processor is operable to determine the requested network by parsing the text at a delimiter to determine a value for the pass-through field and the requested network.

10. The virtual address translation module of claim 9, wherein the pass-through field comprises a user identifier field, and wherein the processor is further operable to set the pass-through field equal to the value for the pass-through field.

11. The virtual address translation module of claim 8, wherein the processor is further operable to:
communicate a domain name request to a domain name server using the interface, the domain name request identifying the requested network;
receive an internet protocol (IP) address for the gateway from the domain name server; and
modify a header of the network access request such that a destination address of the header indicates the IP address for the gateway.

12. The virtual address translation module of claim 8, wherein:
the interface is further operable to receive a second network access request for establishment of a second communication link for data communications for a second mobile device, the second network access request comprising a requested network field and a pass-through field; and
the processor is further operable to determine that the pass-through field of the second network access request does not include a delimiter used to indicate virtual network access requests, to determine a network value in the requested network field of the second network access request, to determine an internet protocol (IP) address based on the network value, and to modify a header of the second network access request such that a destination address of the header indicates the IP address.

13. The virtual address translation module of claim 8, wherein the pass-through field does not affect operation of a home location register in verifying a network value indicated in the requested network field of the received network access request.

14. The virtual address translation module of claim 8, wherein:
the request is a create packet data protocol (PDP) context request generated by a serving generalized packet radio service (GPRS) support node (SGSN);
the requested network is an access point name set by the mobile device; and
the requested network field is an access point name information element of the network access request.

15. Logic for processing network access requests for mobile devices, the logic encoded in media and operable when executed to perform the steps of:
receiving a network access request for establishment of a communication link for data communications for a mobile device, the network access request comprising a requested network field and a pass-through field;

determining a requested network from text in the pass-through field;

setting the requested network field to the requested network;

determining a gateway linking to the requested network; and forwarding the network access request to the gateway.

16. The logic of claim 15, further operable to determine the requested network comprises by the text at a delimiter to determine a value for the pass-through field and the requested network.

17. The logic of claim 16, wherein the pass-through field comprises a user identifier field, the logic further operable to set the pass-through field equal to the value for the pass-through field.

18. The logic of claim 15, further operable to perform the steps of:

communicating a domain name request to a domain name server, the domain name request identifying the requested network;

receiving an internet protocol (IP) address for the gateway from the domain name server; and modifying a header of the network access request such that a destination address of the header indicates the IP address for the gateway.

19. The logic of claim 15, further operable to perform the steps of:

receiving a second network access request for establishment of a second communication link for data communications for a second mobile device, the second network access request comprising a requested network field and a pass-through field;

determining that the pass-through field of the second network access request does not include a delimiter used to indicate virtual network access requests;

determining a network value in the requested network field of the second network access request;

determining an internet protocol (IP) address based on the network value;

modifying a header of the second network access request such that a destination address of the header indicates the IP address; and forwarding the second network access request to the IP address.

20. The logic of claim 15, wherein the pass-through field does not affect operation of a home location register in verifying a network value indicated in the requested network field of the received network access request.

21. The logic of claim 15, wherein:

the request is a create packet data protocol (PDP) context request generated by a serving generalized packet radio service (GPRS) support node (SGSN);

the requested network is an access point name set by the mobile device; and the requested network field is an access point name information element of the network access request.

22. A virtual address translation module comprising:

means for receiving a network access request for establishment of a communication link for data communications for a mobile device, the network access request comprising a requested network field and a pass-through field;

means for determining a requested network from text in the pass-through field;

means for setting the requested network field to the requested network;

means for determining a gateway linking to the requested network; and means for forwarding the network access request to the gateway.

23. A system for supporting wireless access of mobile devices to packet-based networks, the system comprising:

a serving node operable to receive network request information from a mobile device, the network request information comprising a requested network value and a pass-through value, the serving node operable to validate the network request information with a home location register using the requested network value, to generate a network access request having a requested network field set to the requested network value and a pass-through field set to the pass-through value, to determine an internet protocol (IP) address to receive the network access request based on the requested network value, and to communicate the network access request to the determined IP address;

a virtual address translation module operable to receive the network access request from the serving node, to determine an actually requested network from the pass-through value in the pass-through field, to set the requested network field to the actually requested network, to determine an IP address for a gateway linking to the actually requested network, and to forward the network access request to the gateway; and the gateway operable to receive the network access request from the virtual address translation module and, in response to the network access request, to establish a communication channel with the serving node for the transport of packets communicated between the mobile device and the actually requested network.

* * * * *